US012454128B2

(12) United States Patent
Kinokuni et al.

(10) Patent No.: US 12,454,128 B2
(45) Date of Patent: Oct. 28, 2025

(54) DRIVE CONTROLLER, HEAD UNIT, AND LIQUID DISCHARGE APPARATUS

(71) Applicants: Takashi Kinokuni, Tokyo (JP); Ryuji Tsukamoto, Kanagawa (JP)

(72) Inventors: Takashi Kinokuni, Tokyo (JP); Ryuji Tsukamoto, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 255 days.

(21) Appl. No.: 18/144,873

(22) Filed: May 9, 2023

(65) Prior Publication Data

US 2023/0364906 A1 Nov. 16, 2023

(30) Foreign Application Priority Data

May 13, 2022 (JP) ................................ 2022-079612

(51) Int. Cl.
*B41J 2/045* (2006.01)
*B05B 1/30* (2006.01)

(52) U.S. Cl.
CPC ......... *B41J 2/04588* (2013.01); *B05B 1/3046* (2013.01); *B41J 2/04541* (2013.01); *B41J 2/04581* (2013.01); *B41J 2/04593* (2013.01); *B41J 2202/05* (2013.01)

(58) Field of Classification Search
CPC .................................................. B41J 2/04588
See application file for complete search history.

(56) References Cited

U.S. PATENT DOCUMENTS

| | | | | |
|---|---|---|---|---|
| 5,144,332 A * | 9/1992 | Okuie | B41J 2/211 | 347/15 |
| 8,973,893 B2 * | 3/2015 | Lehner | F02M 51/0603 | 123/498 |
| 2004/0050974 A1 | 3/2004 | Lee et al. | | |
| 2004/0189732 A1 * | 9/2004 | Usuda | B41J 2/0456 | 347/19 |

(Continued)

FOREIGN PATENT DOCUMENTS

| | | |
|---|---|---|
| JP | 9-505766 | 6/1997 |
| JP | 2007-190931 | 8/2007 |

(Continued)

OTHER PUBLICATIONS

Extended European Search Report issued Sep. 27, 2023, in corresponding European Application No. 23172655.5, 8pp.

*Primary Examiner* — Shelby L Fidler
(74) *Attorney, Agent, or Firm* — XSENSUS LLP

(57) ABSTRACT

A drive controller includes circuitry. The circuitry generates multiple types of drive pulses to be applied to a driver of a liquid discharge head including a valve to open and close a discharge port, and applies the multiple types of drive pulses to the driver to cause the driver to move the valve to open and close the discharge port. Each of the multiple types of drive pulses causes the valve to move away from the discharge port at a valve-opening speed to open the discharge port, keep opening the discharge port for an open time, and move toward the discharge port at a valve-closing speed to close the discharge port. Further, the circuitry generates the multiple types of drive pulses, the open time and the valve-closing speed of which are different, and changes the valve-closing speed according to the open time.

12 Claims, 12 Drawing Sheets

(56) References Cited

U.S. PATENT DOCUMENTS

| | | | | |
|---|---|---|---|---|
| 2004/0261700 | A1* | 12/2004 | Edwards | B41J 2/04 118/679 |
| 2016/0004257 | A1* | 1/2016 | Fliess | F16K 17/00 137/340 |
| 2018/0085773 | A1 | 3/2018 | Sakai et al. | |
| 2018/0221910 | A1* | 8/2018 | Burzo | B05C 11/1034 |
| 2019/0217614 | A1 | 7/2019 | Kaiba et al. | |
| 2019/0337008 | A1* | 11/2019 | Gould | B05C 21/00 |
| 2020/0039217 | A1 | 2/2020 | Kaiba et al. | |
| 2020/0324312 | A1 | 10/2020 | Kaiba et al. | |
| 2022/0184967 | A1 | 6/2022 | Hiraga | |
| 2022/0379609 | A1 | 12/2022 | Matsufuji et al. | |

FOREIGN PATENT DOCUMENTS

| | | | |
|---|---|---|---|
| JP | 2009-012188 | | 1/2009 |
| JP | 2018-51477 | A | 4/2018 |
| JP | 2020-023177 | | 2/2020 |
| WO | WO1993/023172 | A1 | 11/1993 |

* cited by examiner 16
17
11
15
14
90
50

COMPARATIVE EXAMPLE
DISPLACEMENT
TIME
0
A
B
C
D
E
F
G

COMPARATIVE EXAMPLE
VOLTAGE
TIME

FIG. 11H COMPARATIVE EXAMPLE

FIG. 11I COMPARATIVE EXAMPLE

DRIVE CONTROLLER, HEAD UNIT, AND LIQUID DISCHARGE APPARATUS

CROSS-REFERENCE TO RELATED APPLICATION

This patent application is based on and claims priority pursuant to 35 U.S.C. § 119(a) to Japanese Patent Application No. 2022-079612, filed on May 13, 2022, in the Japan Patent Office, the entire disclosure of which is hereby incorporated by reference herein.

BACKGROUND

Technical Field

Embodiments of the present disclosure relate to a drive controller, a head unit, and a liquid discharge apparatus.

Related Art

A liquid discharge apparatus called valved nozzle type is known in the art, in which a valve opens and closes a discharge port from which a liquid is discharged.

SUMMARY

Embodiments of the present disclosure describe an improved drive controller that includes circuitry. The circuitry generates multiple types of drive pulses to be applied to a driver of a liquid discharge head including a valve to open and close a discharge port, and applies the multiple types of drive pulses to the driver to cause the driver to move the valve to open and close the discharge port. Each of the multiple types of drive pulses causes the valve to move away from the discharge port at a valve-opening speed to open the discharge port, keep opening the discharge port for an open time, and move toward the discharge port at a valve-closing speed to close the discharge port. Further, the circuitry generates the multiple types of drive pulses, the open time and the valve-closing speed of which are different, and changes the valve-closing speed according to the open time.

According to another embodiment of the present disclosure, there is provided a drive controller that includes circuitry. The circuitry generates multiple types of drive pulses to be applied to a driver of a liquid discharge head including a valve to open and close a discharge port, and applies the multiple types of drive pulses to the driver to cause the driver to move the valve to open and close the discharge port. Each of the multiple types of drive pulses has a valve-opening slew rate at which the valve opens the discharge port, a hold time in which the valve is kept in an open state, and a valve-closing slew rate at which the valve closes the discharge port. Further, the circuitry generates the multiple types of drive pulses, the hold time and the valve-closing slew rate of which are different, and changes the valve-closing slew rate according to the hold time.

According to yet another embodiment of the present disclosure; there is provided a head unit that includes a liquid discharge head and circuitry. The liquid discharge head includes a valve to open and close the discharge port from which a liquid is discharged, and a driver to drive the valve. The circuitry generates multiple types of drive pulses to be applied to the driver of the liquid discharge head. The multiple types of drive pulses includes a first drive pulse and a second drive pulse different from the first drive pulse. The circuitry selectivity applies the multiple types of drive pulses to the driver to cause the driver to move the valve to open and close the discharge port. The first drive pulse causes the valve to move away from the discharge port at a first valve-opening speed to open the discharge port, keep opening the discharge port for a first open time, and move toward the discharge port at a first valve-closing speed to close the discharge port. The second drive pulse causes the valve to move away from the discharge port at a second valve-opening speed to open the discharge port, keep opening the discharge port for a second open time longer than the first open time, and move toward the discharge port at a second valve-closing speed faster than the first valve-closing speed to close the discharge port.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 11H is a graph of the amount of displacement of the needle valve at that time;

FIG. 11I is a graph of the voltage applied to the liquid discharge head at that time.

Figure 1:
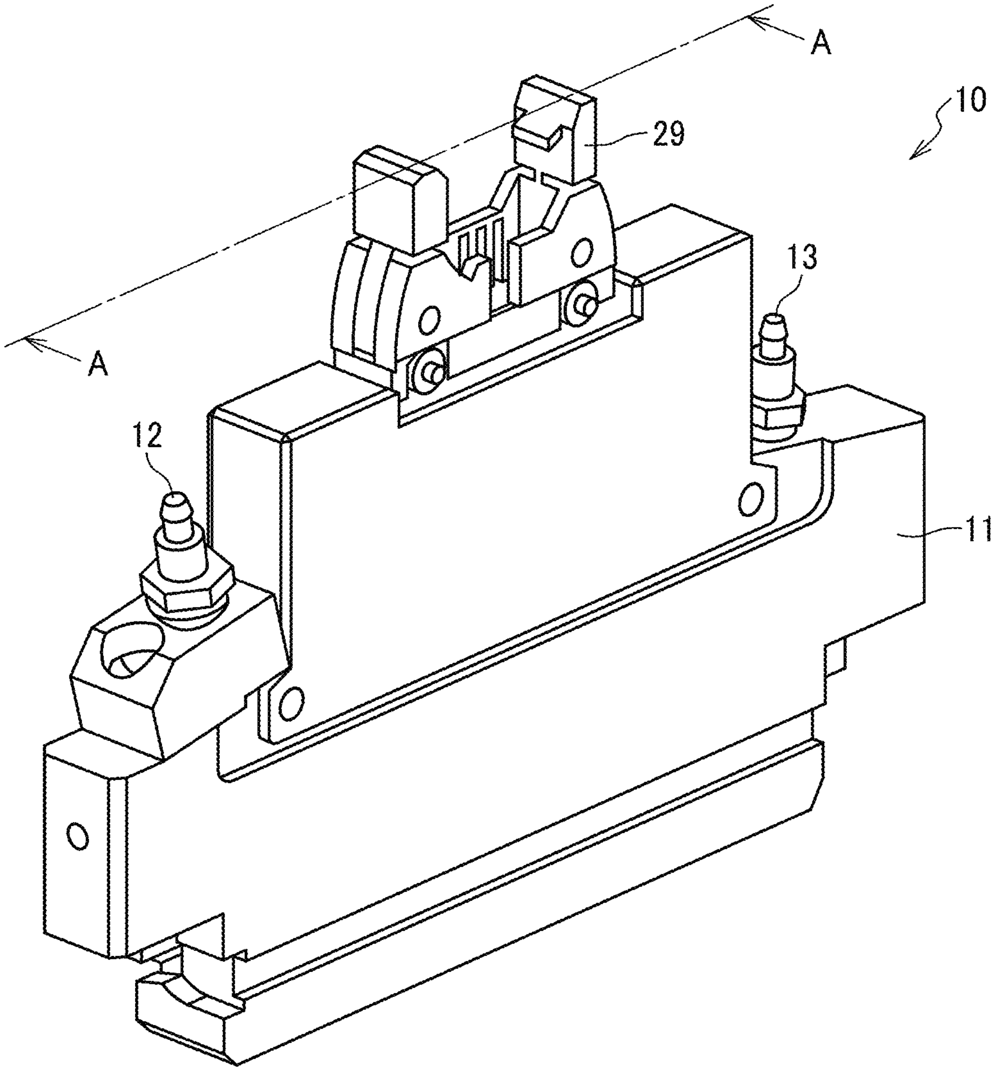
FIG. 1 is a perspective view of a liquid discharge head according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings; specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Embodiments of the present disclosure are described below with reference to the drawings. In the following description, as a drive controller according to an embodiment of the present disclosure, the drive controller that drives a valve provided in a liquid discharge head is described. The liquid discharge head discharges ink as a liquid.

FIG. 1 is an entire perspective view of a liquid discharge head 10. The liquid discharge head 10 includes a housing 11. The housing 11 is made of metal or resin. The housing 11 includes a connector 29 for communication of electrical signals at an upper portion thereof. A supply port 12 and a collection port 13 are disposed on the left and right sides of the housing 11 in FIGS. 1 and 2. Ink is supplied into the liquid discharge head 10 through the supply port 12 and drained from the liquid discharge head 10 through the collection port 13.

Figure 2:
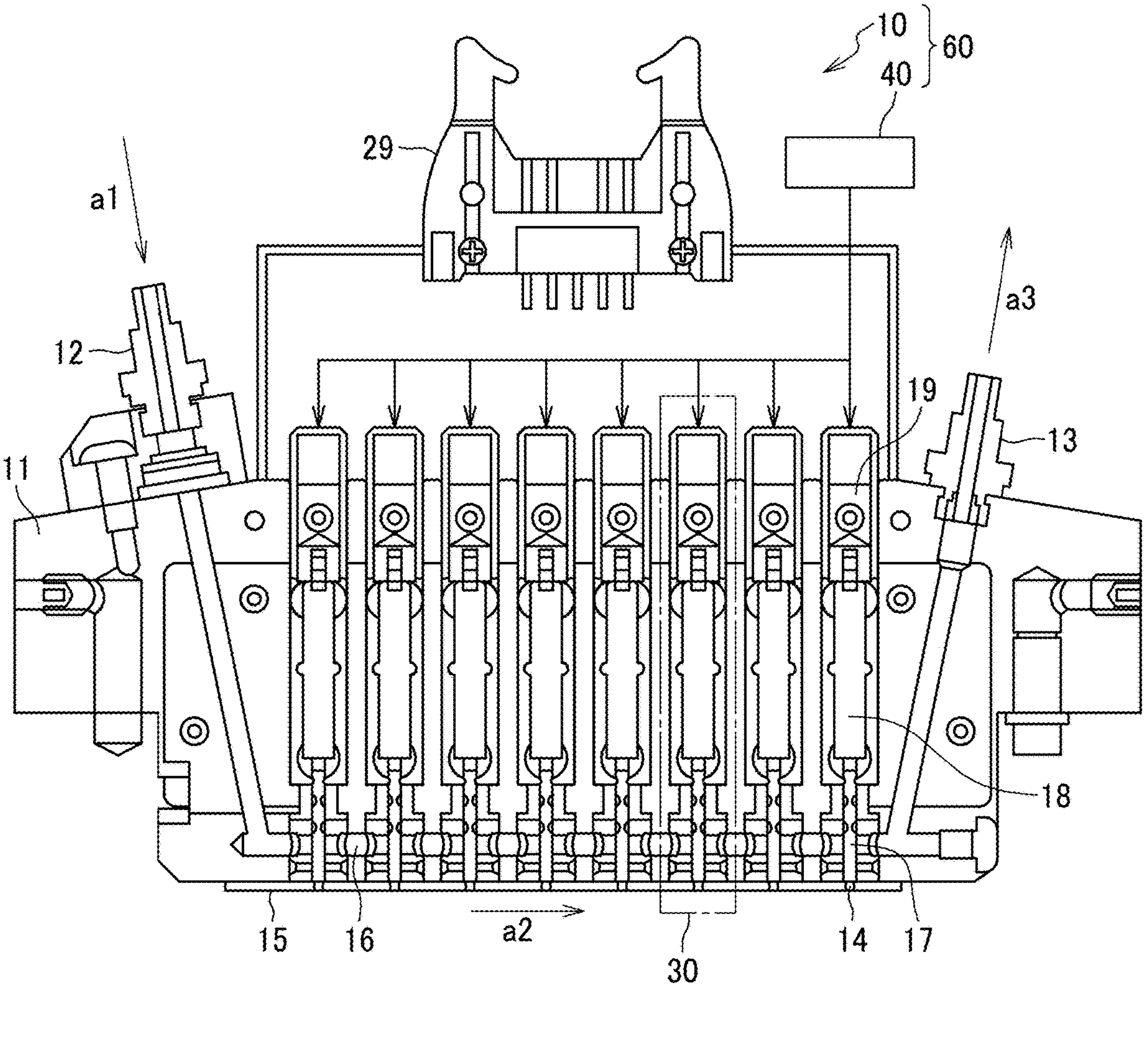
FIG. 2 is a cross-sectional view of a head unit according to an embodiment of the present disclosure.

FIG. 2 is a schematic view of a head unit 60, which also illustrates a cross section of the liquid discharge head 10 taken along line A-A in FIG. 1 as viewed in the direction indicated by arrows in FIG. 1. The head unit 60 includes the liquid discharge head 10 and a drive controller 40.

The liquid discharge head 10 includes a nozzle plate 15. The nozzle plate 15 is joined to the housing 11. The nozzle plate 15 has a nozzle 14 from which ink is discharged. The housing 11 includes a channel 16. The channel 16 is a flow path through which the ink is fed from the supply port 12 to the collection port 13 over the nozzle plate 15. The ink is fed in the channel 16 in a direction indicated by arrows a1 to a3 in FIG. 2.

Liquid discharge modules 30 are disposed between the supply port 12 and the collection port 13. Each of the liquid discharge modules 30 discharges the ink in the channel 16 from the nozzle 14. The number of the liquid discharge modules 30 matches the number of the nozzles 14. In the present embodiment, the eight liquid discharge modules 30 correspond to the eight nozzles 14 arranged in a row, respectively. The number and an arrangement of the nozzles 14 and the liquid discharge modules 30 are not limited to eight as described above. For example, the number of nozzles 14 and the number of liquid discharge modules 30 may be one instead of plural. The nozzles 14 and the liquid discharge modules 30 may be arranged in multiple rows instead of one row.

With the above-described configuration, the supply port 12 takes in pressurized ink from the outside of the liquid discharge head 10, feeds the ink in the direction indicated by arrow a1, and supplies the ink to the channel 16. The channel 16 feeds the ink from the supply port 12 in the direction indicated by arrow a2. Then, the collection port 13 drains the ink that is not discharged from the nozzles 14 in the direction indicated by arrow a3. The nozzles 14 are arranged along the channel 16.

The liquid discharge module 30 includes a needle valve 17 and a piezoelectric element 18. The needle valve 17 opens and closes the nozzle 14, and the piezoelectric element 18 drives (moves) the needle valve 17. The housing 11 includes a restraint 19 at a position facing an upper end of the piezoelectric element 18 in FIG. 2. The restraint 19 is in contact with the upper end of the piezoelectric element 18 to define a fixing point of the piezoelectric element 18.

The nozzle 14 is an example of a discharge port, the nozzle plate 15 is an example of a discharge port forming component, the needle valve 17 is an example of an opening and closing valve (also simply referred to as a valve), and the piezoelectric element 18 is an example of a driver.

As the piezoelectric element 18 is operated to move the needle valve 17 upward, the nozzle 14 that has been closed by the needle valve 17 is opened, so that ink is discharged from the nozzle 14. As the piezoelectric element 18 is operated to move the needle valve 17 downward, a leading end of the needle valve 17 comes into contact with the nozzle 14 to close the nozzle 14, so that the ink is not discharged from the nozzle 14. The liquid discharge head 10 may temporarily stops draining ink from the collection port 13 while discharging the ink to a liquid discharge target to prevent a decrease in an ink discharge efficiency from the nozzles 14.

Figure 3A:
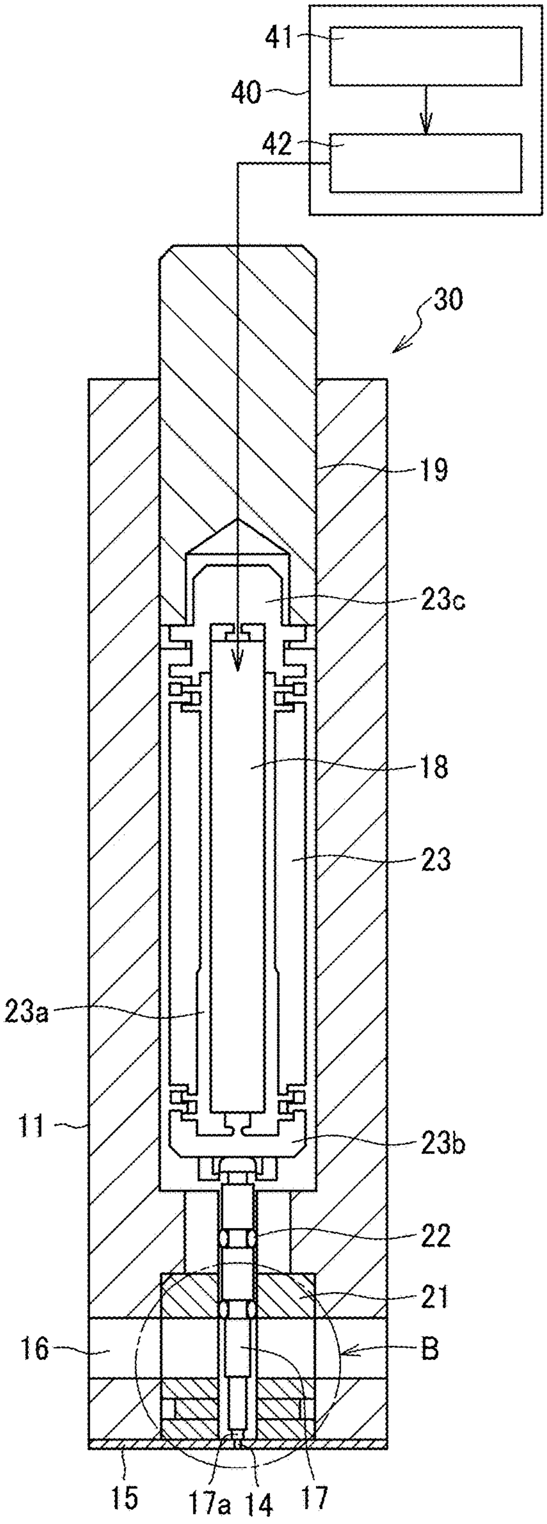
FIGS. 3A and 3B are cross-sectional views of a liquid discharge module of the liquid discharge head according to an embodiment of the present disclosure.
Figure 3B:
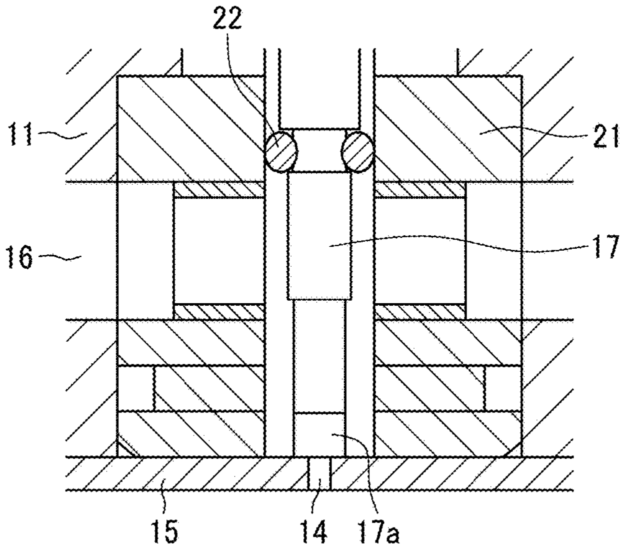

FIGS. 3A and 3B are schematic cross-sectional views of one liquid discharge module of the liquid discharge head 10. FIG. 3A is an overall cross-sectional view of the liquid discharge module 30, and FIG. 3B is an enlarged view of a portion B in FIG. 3A. The channel 16 is shared with the multiple liquid discharge modules 30 in the housing 11 (see FIG. 2).

The needle valve 17 includes an elastic member 17*a* at the leading end thereof. When the leading end of the needle valve 17 is pressed against the nozzle plate 15, the elastic member 17*a* is compressed. As a result, the needle valve 17 closes the nozzle 14. A bearing portion 21 is disposed between the needle valve 17 and the housing 11. A seal 22 such as an O-ring is disposed between the bearing portion 21 and the needle valve 17.

The piezoelectric element 18 is accommodated in a space inside the housing 11. A holder 23 holds the piezoelectric element 18 in a central space 23*a*. The piezoelectric element 18 and the needle valve 17 are coaxially coupled to each other via a front end 23*b* of the holder 23. The front end 23*b* of the holder 23 is coupled to the needle valve 17, and a rear end 23*c* of the holder 23 is fixed by the restraint 19 attached to the housing 11.

When the drive controller 40 applies a voltage to the piezoelectric element 18, the piezoelectric element 18 contracts and pulls the needle valve 17 via the holder 23. Accordingly, the needle valve 17 moves away from the nozzle 14 to open the nozzle 14. As a result, pressurized ink supplied to the channel 16 is discharged from the nozzle 14. When the drive controller 40 applies no voltage to the piezoelectric element 18, the needle valve 17 closes the nozzle 14. In this state, even if the pressurized ink is supplied to the channel 16, the ink is not discharged from the nozzle 14.

The drive controller 40 includes a waveform generation circuit 41 serving as a drive pulse generator and an amplification circuit 42. The waveform generation circuit 41 as circuitry generates a waveform having a drive pulse to be described later, and the amplification circuit 42 amplifies the voltage to a desired value. Then, the amplified voltage is applied to the piezoelectric element 18. The drive controller 40 applies the voltage to the piezoelectric element 18 to cause the piezoelectric element 18 to move the needle valve 17 to open and close the nozzle 14, thereby controlling a discharge operation of ink from the liquid discharge head 10. When the waveform generation circuit 41 can apply a voltage of a sufficient value, the amplification circuit 42 may be omitted from the drive controller 40.

The waveform generation circuit 41 generates the drive pulse of the waveform in which the voltage applied to the piezoelectric element 18 is changed with time. The waveform generation circuit 41 receives print data from an external personal computer (PC) or a microcomputer in the drive controller 40, and generates the drive pulse based on the received print data. The waveform generation circuit 41 can change the voltage applied to the piezoelectric element 18 and generate multiple types of drive pulses. As described above, the waveform generation circuit 41 generates the drive pulse so that the piezoelectric element 18 expands and contracts in response to the drive pulse to move the needle valve 17 to open and close the nozzle 14.

Figure 4:
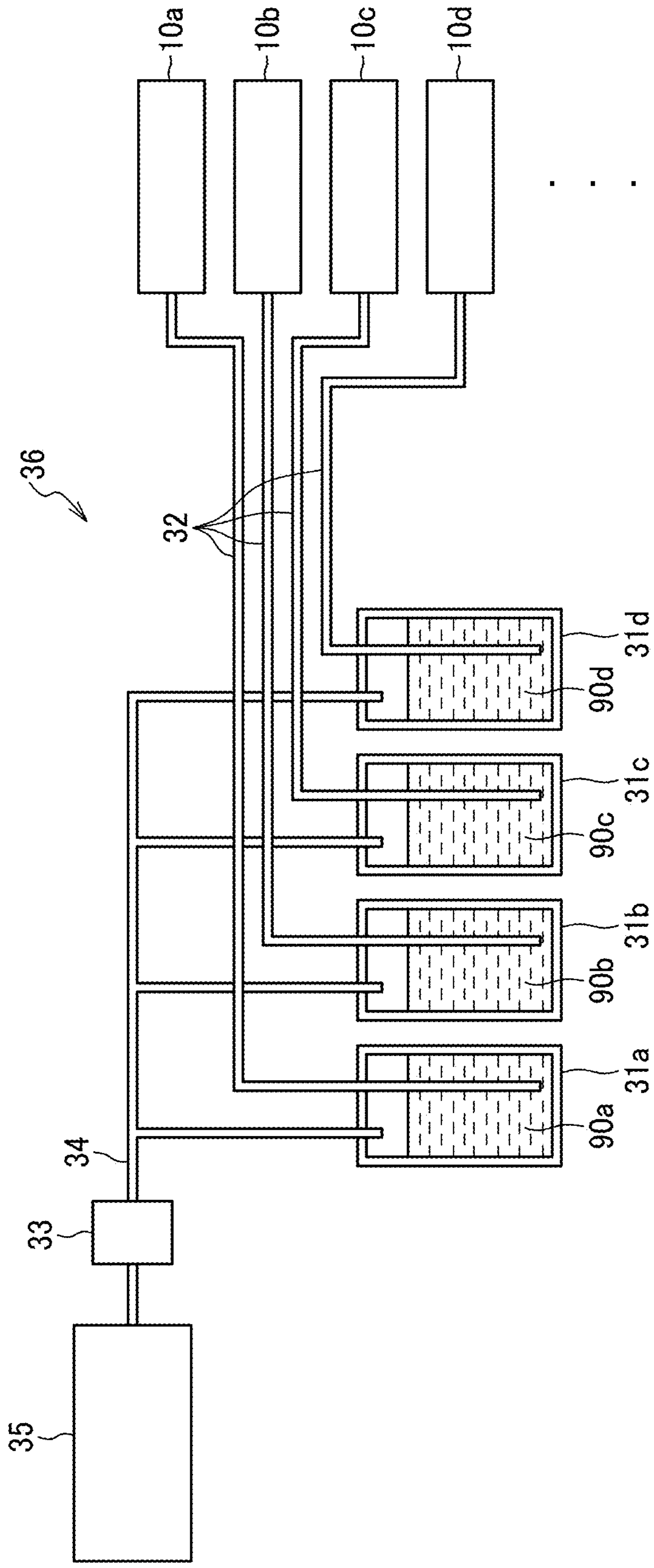
FIG. 4 is a schematic view of a liquid supply device according to an embodiment of the present disclosure.

FIG. 4 is a schematic view of a liquid supply device 36 according to the present embodiment. A liquid discharge apparatus 100 (see FIG. 9) includes tanks 31*a* to 31*d* as closed containers that accommodates inks 90*a* to 90*d* respectively to be discharged from liquid discharge heads 10*a* to 10*d*. In the following descriptions, the inks 90*a* to 90*d* are collectively referred to as ink 90. The tanks 31*a* to 31*d* are collectively referred to as tanks 31.

The tanks 31 and inlets of the liquid discharge heads 10 (i.e., the supply port 12 in FIGS. 1 and 2) are respectively connected to each other via tubes 32. The tanks 31 are coupled to a compressor 35 via a pipe 34 including an air regulator 33. The compressor 35 supplies pressurized air to the tanks 31 to pressurize the ink 90. Thus, the ink 90 is discharged from the nozzle 14 when the needle valve 17 described above opens the nozzle 14 since the ink 90 in the liquid discharge head 10 is in a pressurized state.

The compressor 35, the pipe 34 including the air regulator 33, the tanks 31, and the tubes 32 collectively construct the liquid supply device 36 that pressurizes and supplies the ink 90 to the liquid discharge head 10, for example.

Figure 5:
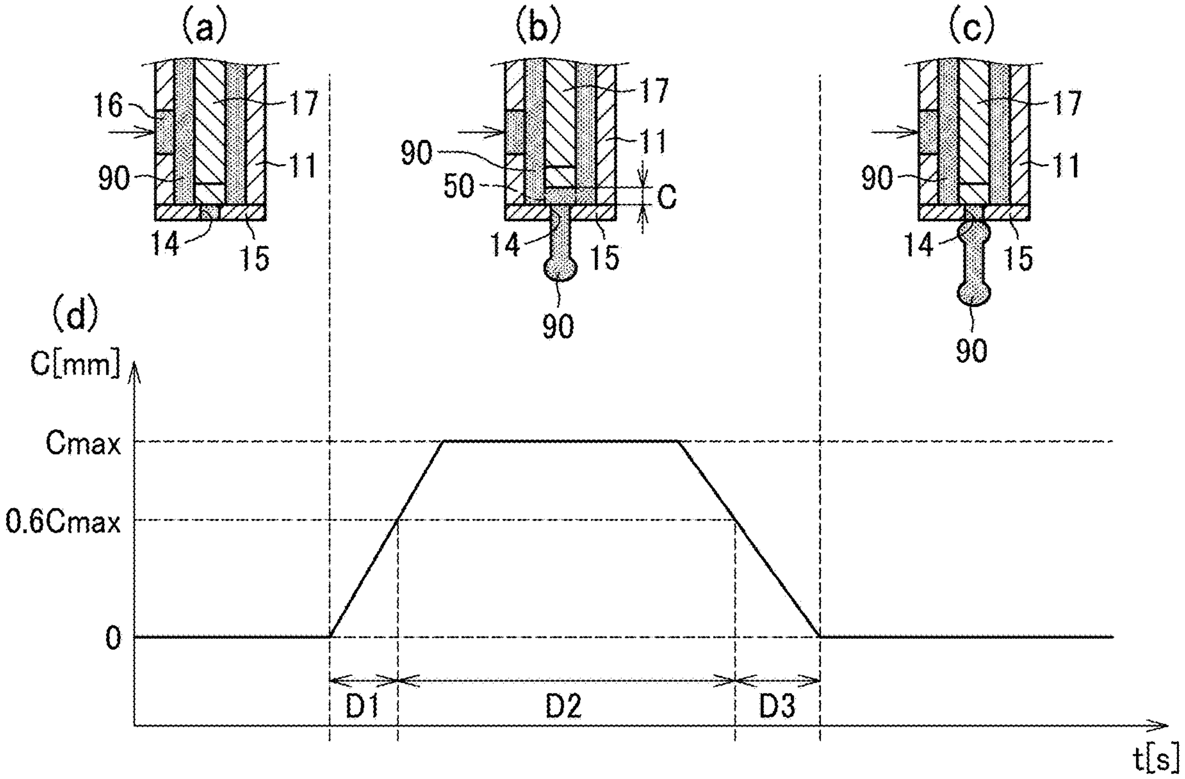
FIG. 5 is an illustration including diagrams (a) to (c) illustrating ink discharge by opening and closing operations of a needle valve and a graph (d) of a drive pulse of a voltage applied to the liquid discharge head at that time.

States in which the drive controller 40 applies the voltage to the piezoelectric element 18 to drive the needle valve 17 are described below with reference to FIG. 5. Parts (a) to (c) of FIG. 5 are diagrams of the liquid discharge module 30 illustrating the states in which the needle valve 17 opens and closes the nozzle 14. A part (d) of FIG. 5 is a graph of an amount of displacement of the needle valve 17 at that time. The horizontal axis represents time t (s), and the vertical axis represents the amount of displacement C (mm) of the needle valve 17. The amount of displacement of the needle valve 17 indicates an amount of movement of the needle valve 17 from a position "0" at which the needle valve 17 contacts the nozzle plate 15 to close the nozzle 14 as illustrated in the part (a) of FIG. 5 toward an upper position in an opening direction to open the nozzle 14, which is an upward direction in the parts (a), (b), and (c) of FIG. 5.

The drive controller 40 applies the drive pulse to the piezoelectric element 18 to expand and contract the piezoelectric element 18 to drive the needle valve 17. The drive pulse is a pulse of the voltage applied to the piezoelectric element 18. The drive pulse is substantially proportional to the amount of displacement of the needle valve 17 when the piezoelectric element 18 can respond sufficiently fast to the drive pulse. That is, the waveform of the drive pulse, generated by the drive controller 40, with respect to the time "t" has substantially the same shape as a transition of the amount of displacement of the needle valve 17 changing with the time "t" in the part (d) of FIG. 5. The waveform of the amount of displacement C illustrated the part (d) of FIG. 5 coincides with (is equal to) the waveform of the drive pulse in the following description.

When the voltage applied to the piezoelectric element 18 is 0 V, the piezoelectric element 18 expands and the needle valve 17 contacts the nozzle plate 15 as illustrated in the part (a) of FIG. 5. As a result, the needle valve 17 closes the nozzle 14. In the part (d) of FIG. 5 and the subsequent drawings, the amount of displacement of the needle valve 17 is 0 when the needle valve 17 closes the nozzle 14, and the amount of displacement C is defined as a distance the needle valve 17 is displaced from the position "0." The voltage is set to 0 V when the nozzle 14 is closed in the present embodiment. However, a voltage other than 0 V may be used as long as the voltage is smaller than a predetermined voltage.

As the voltage is applied to the piezoelectric element 18, the piezoelectric element 18 contracts. As a result, as illustrated in the part (b) of FIG. 5, the needle valve 17 moves upward in the part (b) of FIG. 5B, and a gap region 50 is formed between the needle valve 17 and the nozzle plate 15. Then, as illustrated in the part (c) of FIG. 5, the needle valve 17 comes into contact with the nozzle plate 15 again to close the nozzle 14 by stopping the application of the voltage to the piezoelectric element 18 or reducing the voltage applied to the piezoelectric element 18.

As illustrated in the part (d) of FIG. 5, opening and closing operations of the nozzle 14 by the needle valve 17 is divided into three sections: an ascending section D1 in which the amount of displacement of the needle valve 17 increases; a holding section D2 in which the amount of displacement of the needle valve 17 is held in a range between 0.6 times a maximum displacement Cmax and the maximum displacement Cmax; and a descending section D3 in which the amount of displacement of the needle valve 17 decreases.

Since the ink 90 in the housing 11 of the liquid discharge head 10 is pressurized by the compressor 35 (see FIG. 4), when the needle valve 17 moves upward to open the nozzle 14 as illustrated in the part (b) of FIG. 5, the ink 90 enters the gap region 50 between the needle valve 17 and the nozzle plate 15. Then, in the ascending section D1 in which the amount of displacement of the needle valve 17 increases and the subsequent holding section D2, the ink 90 starts to be discharged from the nozzle 14 due to a liquid pressure applied to the ink 90. Thereafter, when the needle valve 17 starts to move downward, in the descending section D3, the ink 90 in the gap region 50 is further pushed out and discharged from the nozzle 14 due to a pressure force received from the needle valve 17 moving downward in addition to the liquid pressure of the ink 90 pressurized by the compressor 35.

As described above, in the configuration in which the needle valve 17 is driven to open and close the nozzle 14, in addition to the liquid pressure applied to the ink 90, the pressure force accompanying the closing operation of the needle valve 17 to close the nozzle 14 contributes to the ink 90 discharged from the nozzle 14 (i.e., ink discharge).

A contribution ratio of the liquid pressure to the ink discharge and the contribution ratio of the pressure force of the needle valve 17 to the ink discharge differ depending on an open time during which the needle valve 17 opens the nozzle 14.

Specifically, when a small droplet of the ink 90 is discharged, since the open time of the needle valve 17 is set to be short, the contribution ratio to the ink discharge is dominated by the pressure force of the needle valve 17 rather than the liquid pressure of the ink 90. That is, when the nozzle 14 is opened for a short time, since the nozzle 14 is closed immediately after being opened, the ink 90 is pushed out by the pressure force accompanying the closing operation of the needle valve 17 before the liquid pressure propagates to the ink 90 in the liquid chamber (i.e., in the gap region 50 between the needle valve 17 and the nozzle plate 15 illustrated in the part (b) of FIG. 5). Accordingly, in this case, since the ink 90 is pushed out mainly by the needle valve 17 moving at high speed, a discharge speed of the ink 90 is increased.

On the other hand, when a large droplet of the ink 90 is discharged, since the open time of the needle valve 17 is set to be long, unlike the case of the small droplet, the contribution ratio to the ink discharge is dominated by the liquid pressure of the ink 90 rather than the pressure force of the needle valve 17. That is, in this case, since the nozzle 14 is opened for a long time, the liquid pressure sufficiently propagates to the ink 90 in the liquid chamber, and the ink 90 is pushed out by the propagated liquid pressure. In this case, the ink 90 in the liquid chamber also receives the pressure force accompanying the closing operation of the needle valve 17, but since the ink 90 is pushed out by the liquid pressure before the ink 90 is pushed out by the pressure force received from the needle valve 17, the ink discharge by the liquid pressure of the ink 90 becomes dominant, and as a result, the discharge speed of the ink 90 becomes slow.

Figures 10A, 10B, 10C, 10D, 10E, 10F, 10G, 10H, 10I:
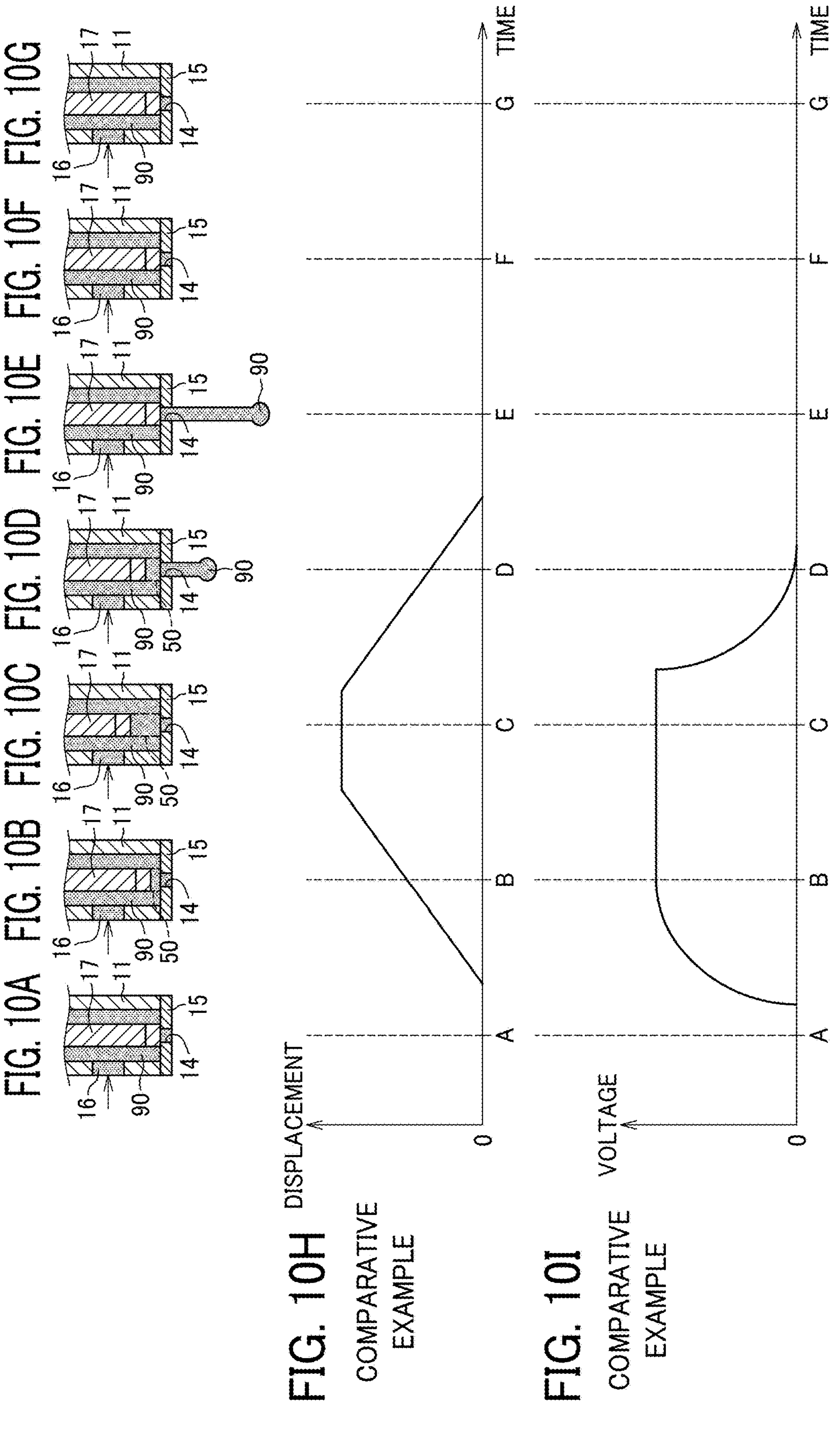
FIGS. 10A to 10G are diagrams illustrating the opening and closing operations of the needle valve according to a comparative example when the open time of the needle valve is short.
FIG. 10H is a graph of the amount of displacement of the needle valve at that time.
FIG. 10I is a graph of the voltage applied to the liquid discharge head at that time.
Figures 11A, 11B, 11C, 11D, 11E, 11F, 11G:
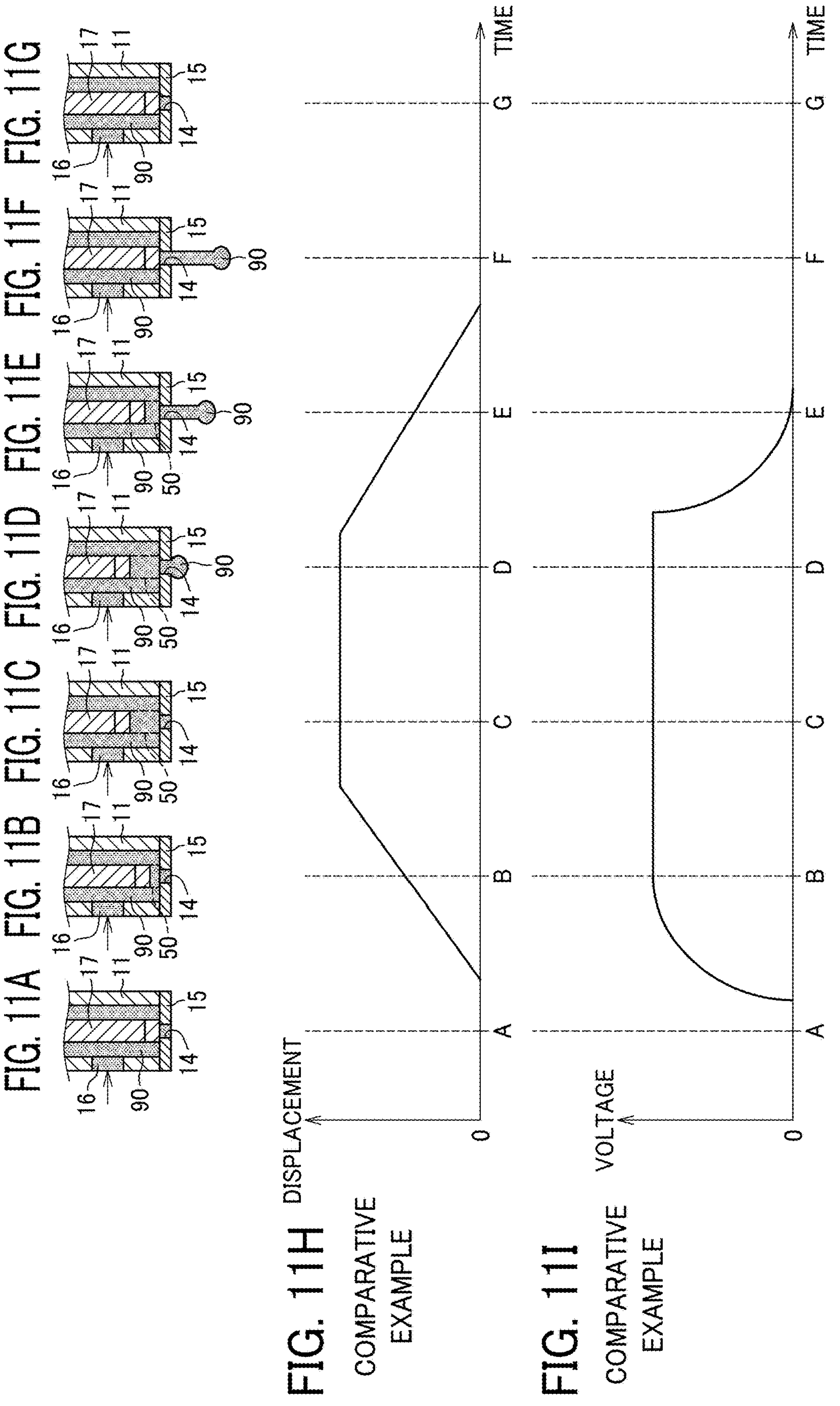
FIGS. 11A to 11G are diagrams illustrating the opening and closing operations of the needle valve according to the comparative example when the open time of the needle valve is long.

FIGS. 10A to 11I illustrate an example of the opening and closing operations of the needle valve 17 in a liquid discharge head according to a comparative example. FIGS. 10A to 10G are diagrams illustrating the opening and closing operations of the needle valve 17, FIG. 10H is a graph of the amount of displacement of the needle valve 17, and FIG. 10I is a graph of the voltage applied to the piezoelectric element 18 when the open time is short. On the other hand. FIGS. 11A to 11G are diagrams illustrating the opening and closing operations of the needle valve 17, FIG. 11H is a graph of the amount of displacement of the needle valve 17, and FIG. 11I is a graph of the voltage applied to the piezoelectric element 18 when the open time is long. Timings A to G on horizontal axes in FIGS. 10H and 10I correspond to the operations of the needle valve 17 illustrated in FIGS. 10A to 10G, respectively, and timings A to G on horizontal axes in FIGS. 11H and 11I correspond to the operations of the needle valve 17 illustrated in FIGS. 11A to 11G, respectively.

When the piezoelectric element 18 does not respond sufficiently fast to the drive pulse, it is possible to adjust the drive pulse according to a change in the amount of displacement of the needle valve 17 desired. In this case, the voltage applied to the piezoelectric element 18 illustrated in FIGS. 10I and 11I is adjusted so that the needle valve 17 is displaced by the amount of displacement illustrated in FIGS. 10H and 11H.

First, a case where the open time is short is described. In this case, when a voltage is applied to the piezoelectric element 18 in a state where the nozzle 14 is closed by the needle valve 17 as illustrated in FIG. 10A, the needle valve 17 starts the opening operation as illustrated in FIG. 10B. As a result, the gap region 50 is formed between the needle valve 17 and the nozzle 14, and the ink 90 enters the gap region 50 as illustrated in FIGS. 10B and 10C. Then, the liquid pressure starts to propagate to the ink 90 in the gap region 50, but when the open time is short, the closing operation of the needle valve 17 starts immediately as illustrated in FIG. 10D. That is, the applied voltage is lowered immediately after the amount of displacement of the needle valve 17 becomes maximum to start the closing operation of the needle valve 17. As a result, the pressure force is applied to the ink 90 by the closing operation of the needle valve 17 moving at high speed before the liquid pressure completely propagates to the ink 90 in the gap region 50 as illustrated in FIGS. 10D and 10E. Therefore, the discharge speed of the ink 90 is increased.

On the other hand, when the open time is long, a period from when the needle valve 17 becomes in an open state to when the closing operation of the needle valve 17 starts is long as illustrated in FIGS. 11C and 11D, and thus the liquid pressure sufficiently propagates to the ink 90 in the liquid chamber. Accordingly, in this case, since the ink 90 is pushed out from the nozzle 14 mainly by the propagated liquid pressure as illustrated in FIGS. 11D, 11E, and 11F, the discharge speed of the ink 90 becomes slow.

As described above, when the open time of the needle valve 17 is long, the discharge speed of the ink 90 is likely to be slower than when the open time is short. Further, since the open time of the needle valve 17 correspond to a width of the drive pulse of the voltage applied to the piezoelectric element 18 (i.e., the driver) that drives the needle valve 17, the discharge speed of the ink 90 is also changed as the width of drive pulse is changed.

Figure 12:
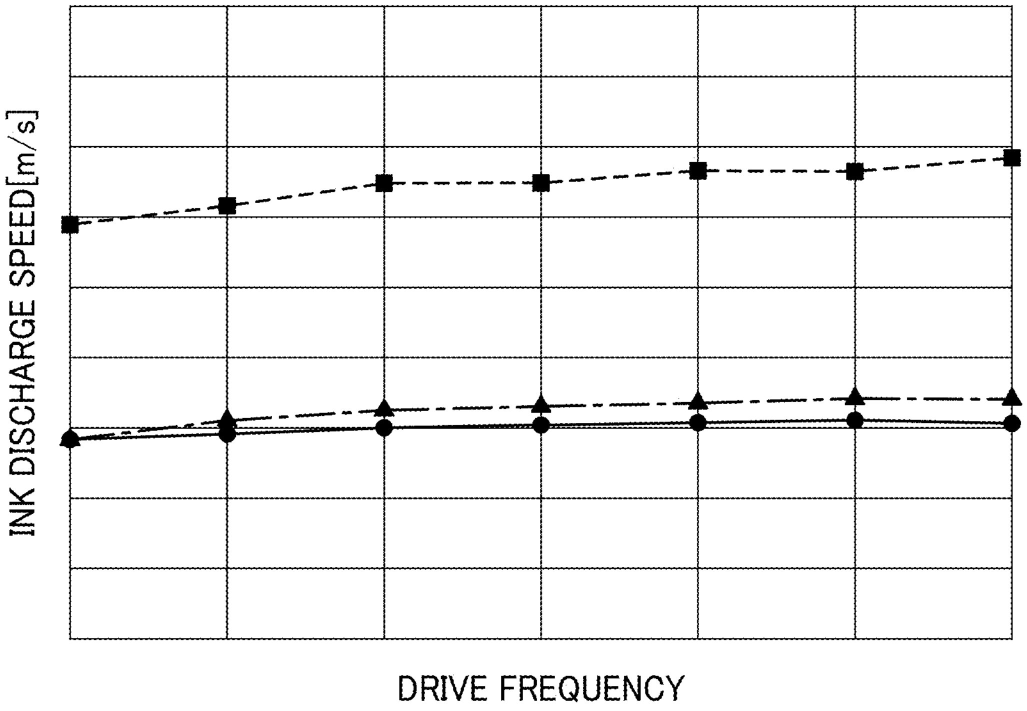
FIG. 12 is a graph illustrating a relation between a width of the drive pulse and a discharge speed of ink.

FIG. 12 is a graph schematically illustrating a relation between the width and drive frequency of the drive pulse and the discharge speed of the ink 90. A horizontal axis in FIG. 12 represents the drive frequency of the drive pulse repeatedly applied to the piezoelectric element 18. The drive frequency increases from left to right on the horizontal axis in FIG. 12. A vertical axis in FIG. 12 represents the discharge speed of the ink 90. The discharge speed increases from bottom to top on the vertical axis in FIG. 12. Among three lines illustrated in FIG. 12, a line plotted with circle marks corresponds to the largest width of the drive pulse, a line plotted with triangle marks correspond to a middle width of the drive pulse, and a line plotted with square marks correspond to the smallest width of the drive pulse.

As illustrated in FIG. 12, the discharge speed of the ink 90 is likely to decrease with an increase in the width of the drive pulse (as illustrated in a lower portion of the graph in FIG. 12), and conversely, the discharge speed of the ink 90 is likely to increase with a decrease in the width of the drive pulse (as illustrated in an upper portion of the graph in FIG. 12).

As described above, in the liquid discharge head according to the comparative example, when the open time or the width of the drive pulse of the needle valve 17 is changed in response to the size of the droplet of the ink 90, the discharge speed of the ink 90 is also changed. For this reason, a position of the object onto which the droplet of the ink 90 is landed and attached may deviate from a desired position depending on the size of the droplet.

Therefore, in the present disclosure, in order to reduce a variation of the discharge speed of the ink 90 as described above, the following control method of the valve (i.e., the needle valve 17) is adopted. A method of controlling the valve is described below with reference to the liquid discharge head 10 according to the above-described embodiment.

As described above, the closing operation of the needle valve 17 affects the discharge speed of the ink 90 in addition to the liquid pressure of the ink 90. Accordingly, if a drive speed of the needle valve 17 during the closing operation is changed, the discharge speed of the ink 90 can be changed, thereby reducing the variation of the discharge speed. Focusing on this point, in the present disclosure, the drive speed of the valve (i.e., the needle valve 17) is changed in response to the open time of the valve.

Therefore, in the above-described embodiment of the present disclosure, the drive controller 40 (see FIG. 3) to control the drive of the needle valve 17 includes the waveform generation circuit 41 (drive pulse generator) that can generate multiple types of drive pulses. The waveform generation circuit 41 can generate the multiple types of drive pulses. Each of the multiple types of drive pulses causes the needle valve 17 to open the nozzle 14 for the open time. The open time and the drive speed of the needle valve 17 are different in each of the multiple types of drive pulses.

Figures 6A, 6B, 6C, 6D, 6E, 6F, 6G, 6H, 6I:
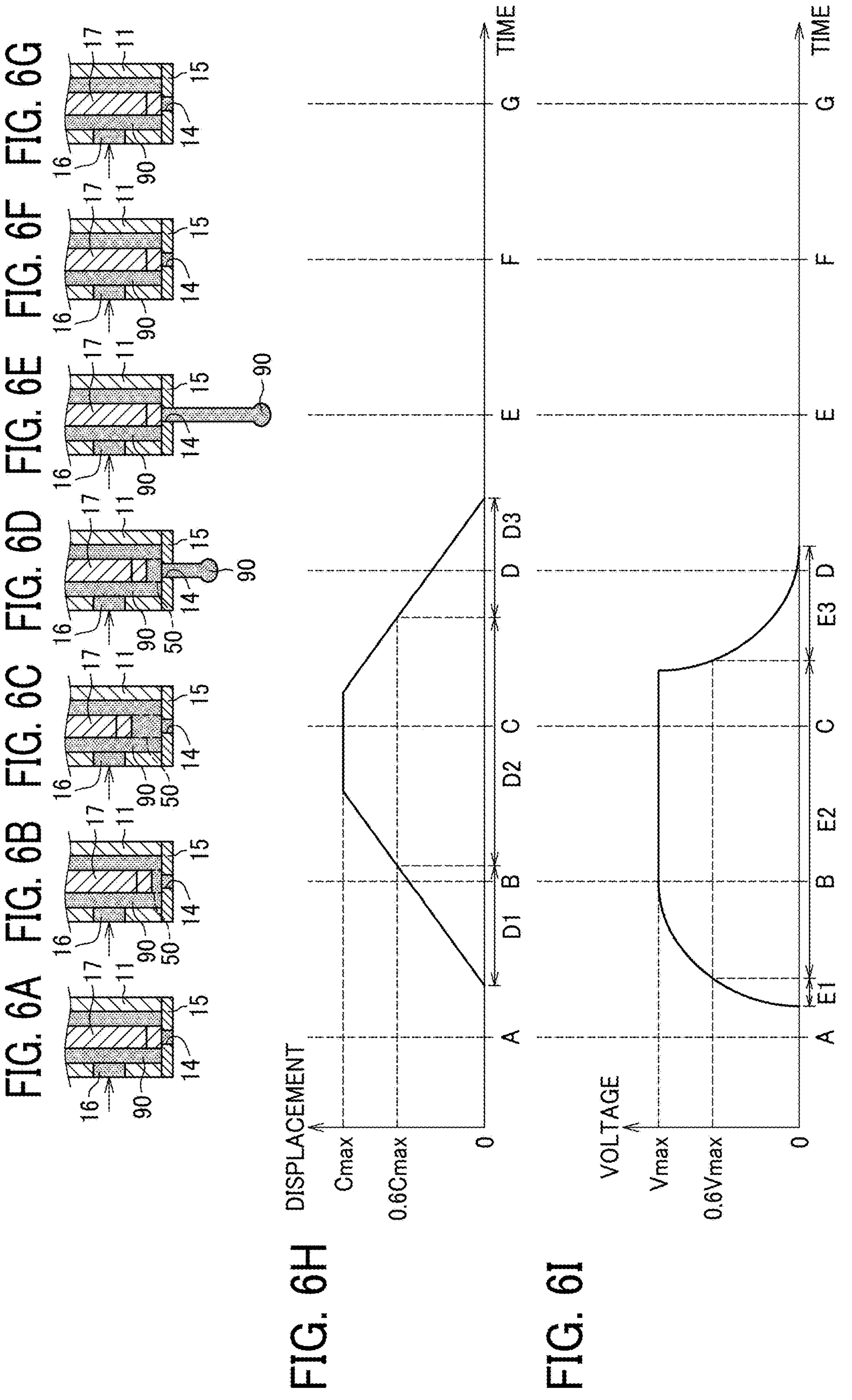
FIGS. 6A to 6G are diagrams illustrating the opening and closing operations of the needle valve according to an embodiment of the present disclosure when an open time of the needle valve is short.
FIG. 6H is a graph of an amount of displacement of the needle valve at that time.
FIG. 6I is a graph of the voltage applied to the liquid discharge head at that time.
Figures 7A, 7B, 7C, 7D, 7E, 7F, 7G, 7H, 7I:
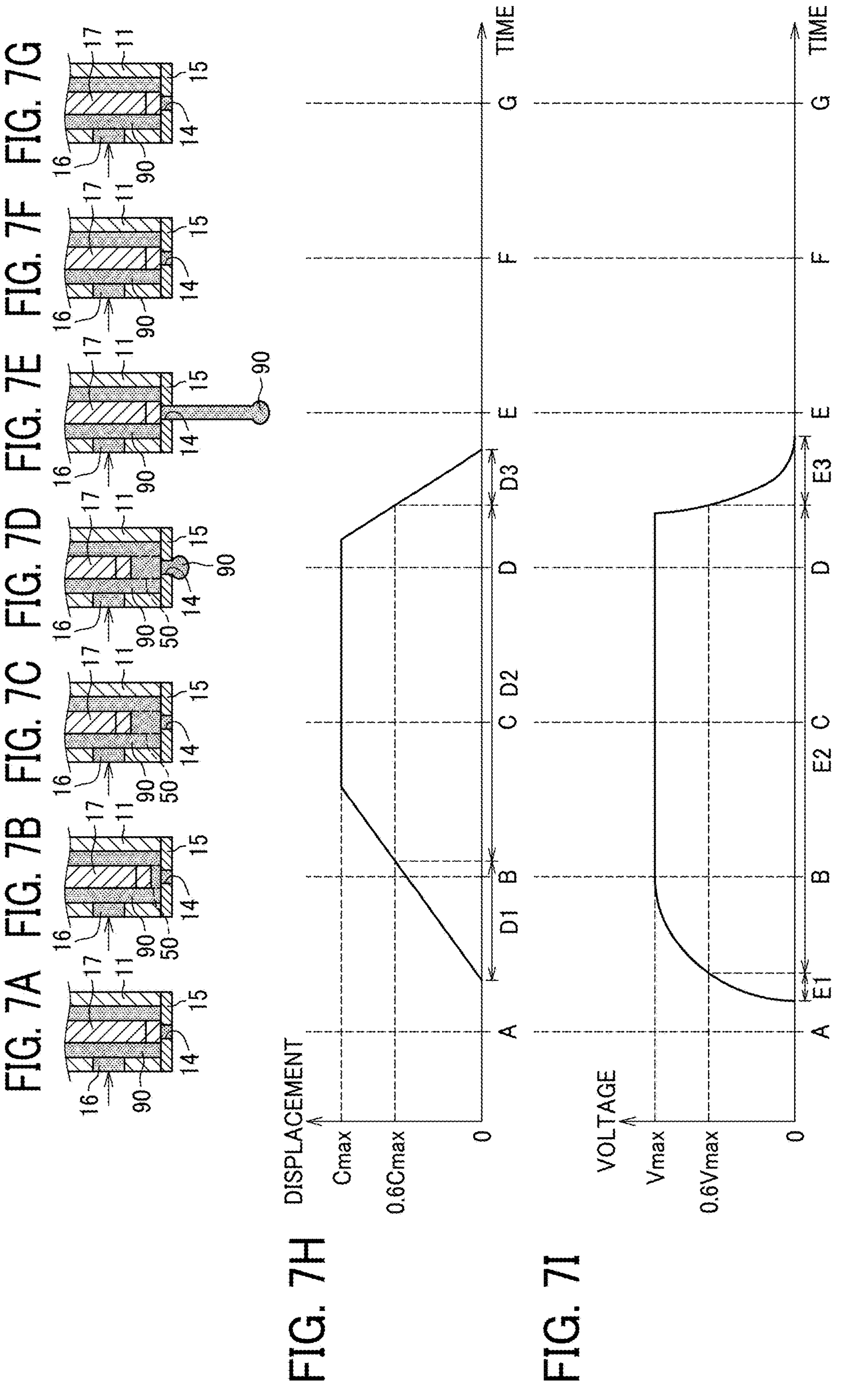
FIGS. 7A to 7G are diagrams illustrating the opening and closing operations of the needle valve according to an embodiment of the present disclosure when the open time of the needle valve is long.
FIG. 7H is a graph of the amount of displacement of the needle valve at that time.
FIG. 7I is a graph of the voltage applied to the liquid discharge head at that time.

FIGS. 6A to 6G and FIGS. 7A to 7G are diagrams illustrating the opening and closing operations of the needle valve 17 controlled by the drive controller 40 (the waveform generation circuit 41), FIGS. 6H and 7H are graphs of the amount of displacement of the needle valve 17, and FIGS. 6I and 7I are graphs of the voltage applied to the piezoelectric element 18. FIGS. 6A to 6I illustrate control when the open time is short, and FIGS. 7A to 7I illustrate control when the open time is long. Timings A to G on horizontal axes in FIGS. 6H and 6I correspond to the operations of the needle valve 17 illustrated in FIGS. 6A to 6G, respectively, and timings A to G on horizontal axes in FIGS. 7H and 7I correspond to the operations of the needle valve 17 illustrated in FIGS. 7A to 7G, respectively.

When the piezoelectric element 18 does not respond sufficiently fast to the drive pulse, it is possible to adjust the drive pulse according to a change in the amount of displacement of the needle valve 17 desired. In this case, the voltage applied to the piezoelectric element 18 illustrated in FIGS. 6I and 7I is adjusted so that the needle valve 17 is displaced by the amount of displacement illustrated in FIGS. 6H and 7H.

The open time during which the needle valve 17 is kept in the open state is different between when the open time is short as illustrated in FIGS. 6A to 6I and when the open time is long as illustrated in FIGS. 7A to 7I. For this reason, a hold time of the applied voltage that keeps the needle valve 17 in the open state is also different therebetween (see the holding section D2 illustrated in FIGS. 6H and 7H or a holding section E2 illustrated in FIGS. 6I and 7I). In the present embodiment, the "open state" of the needle valve 17 means a state in which the amount of displacement of the needle valve 17 is held in the range between 0.6 times the maximum displacement Cmax and the maximum displacement amount Cmax, and the "open time" of the needle valve 17 means the period of the holding section D2 in which the open state is held (see FIGS. 6H and 7H). Alternatively, the "open state" of the needle valve 17 means a state in which the voltage applied to the piezoelectric element 18 is held in the range between 0.6 times the maximum voltage Vmax and the maximum voltage Vmax, and the "open time" of the needle valve 17 means the period of a holding section E2 in which the open state is held (see FIGS. 6I and 7I).

As illustrated in FIGS. 6A to 6I and FIGS. 7A to 7I, in the present embodiment, the drive speed of the needle valve 17 and the slew rate of the applied voltage during the closing operation is changed in response to the open time (see the descending section D3 or E3 illustrated in FIGS. 6H, 6I, 7H, and 7I). In the present embodiment, the "drive speed" of the needle valve 17 during the closing operation is the drive speed (i.e., the amount of displacement of the needle valve 17 per unit time) when the amount of displacement of the needle valve 17 drops below 0.6 times the maximum displacement Cmax (i.e., the descending section D3). The "slew rate" of the applied voltage during the closing operation is the slew rate of the applied voltage (i.e., an amount of change in the applied voltage per unit time) when the voltage applied to the piezoelectric element 18 drops below 0.6 times the maximum voltage Vmax (i.e., the descending section E3).

In the amount of displacement of the needle valve 17 during the closing operation illustrated in FIGS. 6H and 7H, the drive speed is constant (proportional to time) in the descending section D3 in the present embodiment, but the drive speed may be changed in the descending section D3 in another embodiment. In such a case, a value obtained by dividing the amount of displacement of the needle valve 17 in the descending section D3 by the time of the descending section D3 may be used as the drive speed during the closing operation. In the applied voltage during the closing operation illustrated in FIGS. 6I and 7I, the amount of change in the applied voltage per unit time decreases with time in the descending section E3. In such a case, a value obtained by dividing the amount of change in the applied voltage in the descending section E3 by the time of the descending section E3 (i.e., an average of the slew rate in the descending section E3) may be used as the slew rate of the applied voltage during the closing operation.

Specifically, in the present embodiment, when the open time is long as illustrated in FIGS. 7A to 7I, the slew rate of the applied voltage during the closing operation is increased and the drive speed of the needle valve 17 during the closing operation is increased as compared to when the open time is short as illustrated in FIGS. 6A to 6I. Accordingly, in the present embodiment, the waveform generation circuit 41 of the drive controller 40 selectively generates a first drive pulse and a second drive pulse. The first drive pulse causes the piezoelectric element 18 to drive the needle valve 17 when the open time of the needle valve 17 is relatively short as illustrated in FIGS. 6A to 6I. The second drive pulse causes the piezoelectric element 18 to drive the needle valve 17 to open the nozzle 14 for the longer open time of the needle valve 17 than the first drive pulse as illustrated in FIGS. 7A to 7I and to move the needle valve 17 at the faster drive speed than the first drive pulse as illustrated in FIGS. 7A to 7I during the closing operation of the needle valve 17. In other words, the waveform generation circuit 41 selectively generates the first drive pulse (in the case of FIGS. 6A to 6I) and the second drive pulse (in the case of FIGS. 7A to 7I) having the longer hold time of the applied voltage to keep the needle valve 17 in the open state than the first drive pulse and the larger slew rate of the applied voltage during the closing operation of the needle valve 17 than the first drive pulse.

As described above, in the present embodiment, the drive controller 40 increases the drive speed (i.e., a nozzle-closing drive speed) of the needle valve 17 when the open time is long. As a result, the speed of the ink 90 pushed out by the needle valve 17 is also increased, so that the discharge speed of the ink 90 discharged from the nozzle 14 can be increased. Accordingly, the discharge speed of the ink 90 is not decreased when the open time is long, and a variation in the discharge speed of the ink 90 accompanying a change in the open time of the needle valve 17 is reduced. Thus, a control method according to the present embodiment can reduce the variation in landing positions of the ink 90 on the object. Further, the drive controller 40 increases the slew rate of the applied voltage during the closing operation of the needle valve 17. As a result, a control period (i.e., the width of the drive pulse) of the applied voltage can be shortened when the open time is long, and the opening and closing operations of the nozzle 14 by the needle valve 17 can be controlled in a short period.

Another embodiment different from the above-described embodiment is described below. Portions different from the above-described embodiment are mainly described, and descriptions of the same portions are appropriately omitted.

Figures 8A, 8B, 8C, 8D, 8E, 8F, 8G:
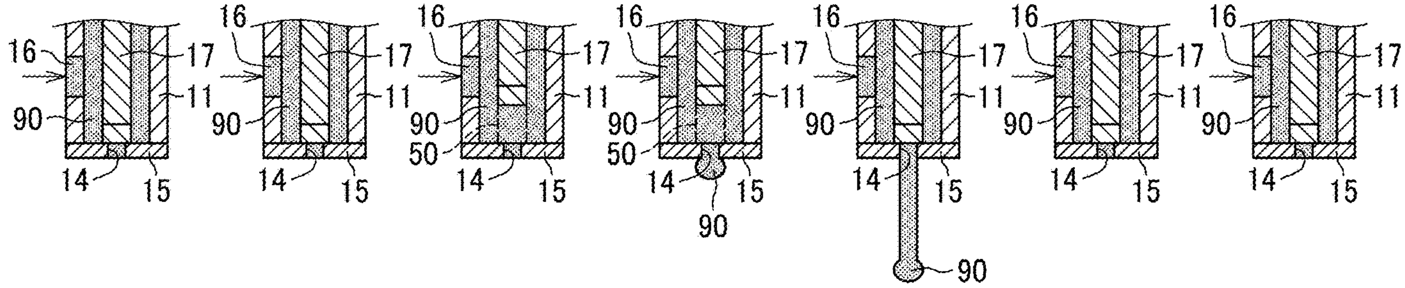
FIGS. 8A to 8G are diagrams illustrating the opening and closing operations of the needle valve according to another embodiment of the present disclosure.
Figure 8H:
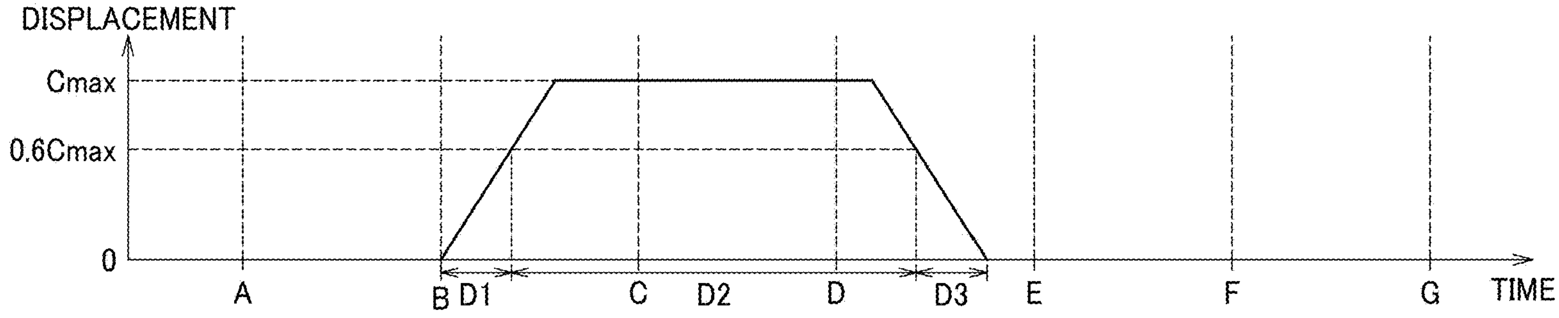
FIG. 8H is a graph of the amount of displacement of the needle valve at that time.
Figure 8I:
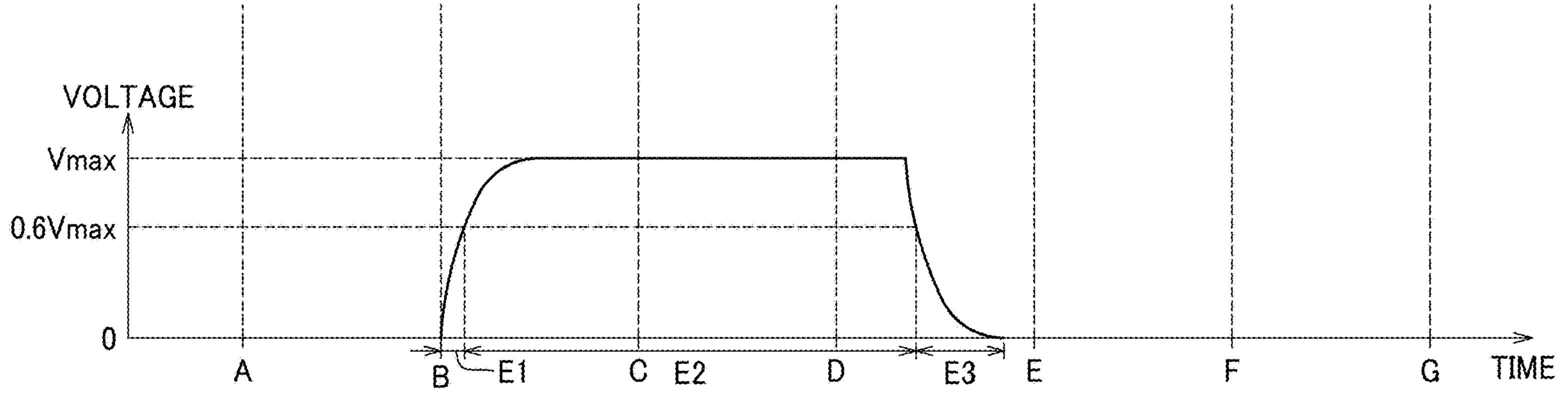
FIG. 8I is a graph of the voltage applied to the liquid discharge head at that time.

FIGS. 8A to 8G are diagrams illustrating the opening and closing operations of the needle valve 17, FIG. 8H is a graph of the amount of displacement of the needle valve 17, and FIG. 8I is a graph of the voltage applied to the piezoelectric element 18. FIGS. 8A to 8I illustrate the control when the open time is long, and the control when the open time is short is the same as the control (the control illustrated in FIGS. 6A to 6I) in the above-described embodiment, and drawings thereof are omitted.

When the piezoelectric element IS does not respond sufficiently fast to the drive pulse, it is possible to adjust the drive pulse according to a change in the amount of displacement of the needle valve 17 desired. In this case, similarly to the control described in the above second embodiment with reference to FIGS. 6A to 6I, the voltage applied to the piezoelectric element 18 illustrated in FIG. 8I is adjusted so that the needle valve 17 is displaced by the amount of displacement illustrated in FIG. 8H.

In another embodiment of the present disclosure illustrated in FIGS. 8A to 8I, when the open time is long (in the case of FIGS. 8A to 8I), the drive speed of the needle valve 17 during the closing operation is increased, and the drive speed of the needle valve 17 during the opening operation is also increased as compared to when the open time is short (in the case of FIGS. 6A to 6I). That is, in the present embodiment, the waveform generation circuit 41 selectively generates the first drive pulse and the second drive pulse. The first drive pulse causes the piezoelectric element 18 to drive the needle valve 17 when the open time of the needle valve 17 is relatively short as illustrated in FIGS. 6A to 6I. The second drive pulse causes the piezoelectric element 18 to drive the needle valve 17 to open the nozzle 14 for the longer open time of the needle valve 17 than the first drive pulse as illustrated in FIGS. 8A to 8I and to move the needle valve 17 at the faster drive speed than the first drive pulse as illustrated in FIGS. 8A to 8I during both the opening operation and the closing operation of the needle valve 17. In other words, the waveform generation circuit 41 selectively generates the first drive pulse and the second drive pulse (in the case of FIGS. 8A to 8I) having the longer hold time of the applied voltage to keep the needle valve 17 in the open state than the first drive pulse and the larger slew rate of the applied voltage during both the opening operation and the closing operation of the needle valve 17 than the first drive pulse. In the present embodiment, the "drive speed" of the needle valve 17 during the opening operation is the drive speed (i.e., the amount of displacement of the needle valve 17 per unit time) before the amount of displacement of the needle valve 17 reaches 0.6 times the maximum displacement Cmax (i.e., the ascending section D1). The "Slew rate" of the applied voltage during the opening operation is the slew rate of the applied voltage (i.e., the amount of change of the applied voltage per unit time) before the voltage applied to the piezoelectric element 18 reaches 0.6 times the maximum voltage Vmax (i.e., the ascending section E1).

In the amount of displacement of the needle valve 17 during the opening operation illustrated. In FIG. 8H, the drive speed is constant (proportional to time) in the ascending section D1 in the present embodiment, but the drive speed may be changed in the ascending section D1 in another embodiment. In such a case, a value obtained by dividing the amount of displacement of the needle valve 17 in the ascending section D1 by the time of the ascending section D1 may be used as the drive speed during the opening operation. In the applied voltage during the opening operation illustrated in FIG. 8I, the amount of change in the applied voltage per unit time decreases with time in the ascending section E1. In such a case, a value obtained by dividing the amount of change in the applied voltage in the ascending section E1 by the time of the ascending section E1 (i.e., an average of the slew rate in the ascending section E1) may be used as the slew rate of the applied voltage during the opening operation.

As described above, in the embodiment illustrated in FIGS. 8A to 8I, the drive speed of the needle valve 17 during the opening operation (i.e., a nozzle-opening drive speed) is increased in addition to the drive speed of the needle valve 17 during the closing operation (i.e., the nozzle-closing drive speed), and the control period (the width of the drive pulse) of the applied voltage when the open time is long can be further shortened. Accordingly, the opening and closing operations of the nozzle 14 by the needle valve 17 can be controlled in a shorter period. The drive speeds (the slew rates of the applied voltage) during the opening operation and the closing operation of the needle valve 17 may be individually controlled in response to the open time of the needle valve 17 (the hold time of the applied voltage to keep the needle valve 17 in the open state). When the drive speed of the needle valve 17 is increased, an amount of heat generated by the driver such as the piezoelectric element 18 that drives the needle valve 17 increases. Accordingly, when the heat is transferred to the ink 90, the viscosity of the ink 90 may increase, and discharge properties of the ink 90 may change. For this reason, a heat radiator to dissipate the heat from the driver or a cooling device to cool the driver is preferably provided.

Figure 9:
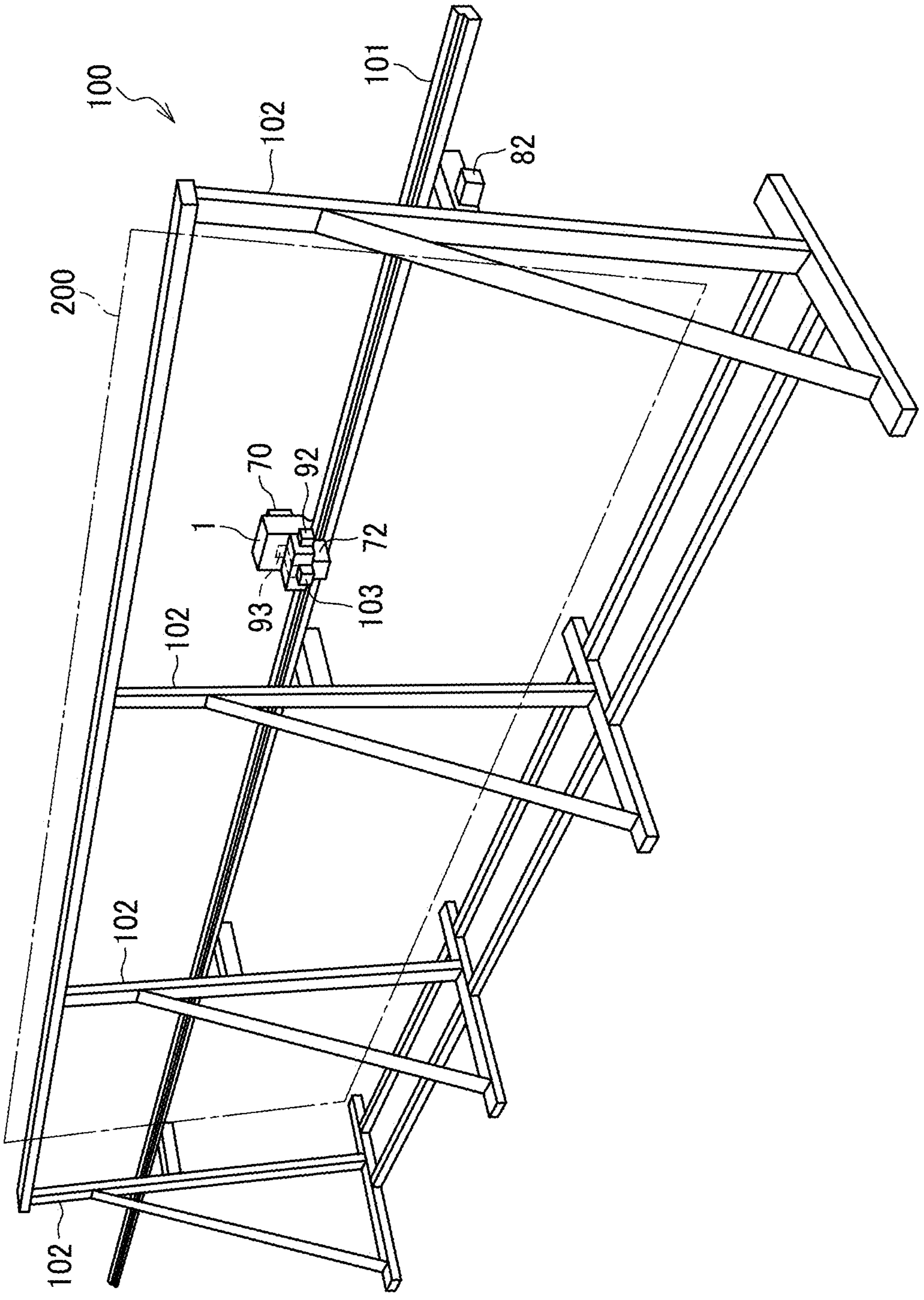
FIG. 9 is a perspective view of a liquid discharge apparatus according to embodiments of the present disclosure.

The liquid discharge apparatus 100 including the head unit 60 including the drive controller 40 according to the above embodiments is described below with reference to FIG. 9. The liquid discharge apparatus 100 illustrated in FIG. 9 is installed so as to face an object 200 onto which the ink 90 (liquid) is discharged. The liquid discharge apparatus 100 includes an X-axis rail 101, a Y-axis rail 102 intersecting the X-axis rail 101, and a Z-axis rail 103 intersecting the X-axis rail 101 and the Y-axis rail 102.

The Y-axis rail 102 movably holds the X-axis rail 101 in the Y direction. The X-axis rail 101 movably holds the Z-axis rail 103 in the X direction. The Z-axis rail 103 movably holds a carriage 1 in the Z direction. The carriage 1 is an example of the head unit 60, and includes the drive controller 40 and the liquid discharge head 10 described above.

Further, the liquid discharge apparatus 100 includes a first Z-direction driver 92 and an X-direction driver 72. The first Z-direction driver 92 moves the carriage 1 in the Z direction along the Z-axis rail 103. The X-direction driver 72 moves the Z-axis rail 103 in the X direction along the X-axis rail 101. The liquid discharge apparatus 100 further includes a Y-direction driver 82 that moves the X-axis rail 101 in the Y direction along the Y-axis rail 102. Further, the liquid discharge apparatus 100 includes a second Z-direction driver 93 that moves a head holder 70 relative to the carriage 1 in the Z direction.

The carriage 1 includes the head holder 70. The head holder 70 is an example of a holding body. The carriage 1 is movable in the Z direction along the Z-axis rail 103 by driving force of the first Z-direction driver 92 illustrated in FIG. 9. Further, the head holder 70 is movable relative to the carriage 1 in the Z direction by driving force of the second Z-direction driver 93 illustrated in FIG. 9.

The liquid discharge apparatus 100 described above discharges the ink 90 from the liquid discharge head 10 mounted on the head holder 70 while moving the carriage 1 along the X-axis, the Y-axis, and the −Z axis, thereby drawing images on the object 200. The ink 90 is an example of liquid. The movement of the carriage 1 and the head holder 70 in the Z direction may not be parallel to the Z direction, and may be an oblique movement including at least a Z direction component. Although the object 200 is flat in FIG. 9, the object 200 may have a surface shape which is nearly vertical or a curved surface with the large radius of curvature, such as a body of a car, a truck, or an aircraft.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

The term "liquid" includes not only ink but also paint.

In the above description, the embodiments in which the drive controller 40 applies a voltage to the driver such as the piezoelectric element 18 to open and close the valve such as the needle valve 17 has been described. However, the present disclosure is not limited thereto, and the valve may be opened and closed by pneumatic pressure or hydraulic pressure. In such a case, the drive pulse generated by the drive controller 40 is a drive waveform for driving the valve with a pressure set by a pneumatic or hydraulic pressurizing mechanism.

In the present disclosure, the term "liquid discharge apparatus" includes a liquid discharge head or a head unit and drives the liquid discharge head to discharge liquid. The term "liquid discharge apparatus" used here includes, in addition to apparatuses to discharge liquid to materials onto which liquid can adhere, apparatuses to discharge the liquid into gas (air) or liquid.

The "liquid discharge apparatus" may further include devices relating to feeding, conveying, and ejecting of the material onto which liquid can adhere and also include a pretreatment device and an aftertreatment device.

The "liquid discharge apparatus" may be, for example, an image forming apparatus to form an image on a sheet by discharging ink, or a three-dimensional fabrication apparatus to discharge fabrication liquid to a powder layer in which powder material is formed in layers to form a three-dimensional object.

The "liquid discharge apparatus" is not limited to an apparatus that discharges liquid to visualize meaningful images such as letters or figures. For example, the liquid discharge apparatus may be an apparatus that forms meaningless images such as meaningless patterns or an apparatus that fabricates three-dimensional images.

The above-described term "material onto which liquid can adhere" serves as the object onto which liquid is discharged as described above and represents a material on which liquid is at least temporarily adhered, a material on which liquid is adhered and fixed, or a material into which liquid is adhered to permeate. Specific examples of the "material onto which liquid can adhere" include, but are not limited to, a recording medium such as a paper sheet, recording paper, a recording sheet of paper, a film, or cloth, an electronic component such as an electronic substrate or a piezoelectric element, and a medium such as layered powder, an organ model, or a testing cell. The "material onto which liquid can adhere" includes any material to which liquid adheres, unless particularly limited.

Examples of the "material onto which liquid can adhere" include any materials to which liquid can adhere even temporarily, such as paper, thread, fiber, fabric, leather, metal, plastic, glass, wood, and ceramic.

The term "liquid discharge apparatus" may be an apparatus to relatively move the liquid discharge head and the material onto which liquid can adhere. However, the liquid discharge apparatus is not limited to such an apparatus. For example, the liquid discharge apparatus may be a serial head apparatus that moves the liquid discharge head or a line head apparatus that does not move the liquid discharge head.

Examples of the liquid discharge apparatus further include: a treatment liquid applying apparatus that discharges a treatment liquid onto a paper sheet to apply the treatment liquid to the surface of the paper sheet, for reforming the surface of the paper sheet; and an injection granulation apparatus that injects a composition liquid, in which a raw material is dispersed in a solution, through a nozzle to granulate fine particle of the raw material.

The terms "image formation," "recording," "printing," "image printing," and "fabricating" used in the present disclosure may be used synonymously with each other.

The above-described embodiments of the present disclosure includes a drive controller, a head unit, and a liquid discharge apparatus having at least one of configurations described in the following aspects.

Aspect 1

According to Aspect 1, a drive controller includes circuitry. The circuitry generates multiple types of drive pulses to be applied to a driver of a liquid discharge head including a valve to open and close a discharge port, and applies the multiple types of drive pulses to the driver to cause the driver to move the valve to open and close the discharge port. Each of the multiple types of drive pulses causes the valve to move away from the discharge port at a valve-opening speed to open the discharge port, keep opening the discharge port for an open time, and move toward the discharge port at a valve-closing speed to close the discharge port. Further, the circuitry generates the multiple types of drive pulses, the open time and the valve-closing speed of which are different, and changes the valve-closing speed according to the open time.

Aspect 2

According to Aspect 2, in the drive controller according to Aspect 1, the circuitry increases the valve-closing speed with an increase in the open time.

Aspect 3

According to Aspect 3, in the drive controller according to Aspect 1 or 2, the circuitry individually controls the valve-opening speed and the valve-closing speed according to the open time.

Aspect 4

According to Aspect 4, a drive controller includes circuitry. The circuitry generates multiple types of drive pulses to be applied to a driver of a liquid discharge head including a valve to open and close a discharge port, and applies the multiple types of drive pulses to the driver to cause the driver to move the valve to open and close the discharge port. Each of the multiple types of drive pulses has a valve-opening slew rate at which the valve opens the discharge port, a hold time in which the valve is kept in an open state, and a valve-closing slew rate at which the valve closes the discharge port. Further, the circuitry generates the multiple types of drive pulses, the hold time and the valve-closing slew rate of which are different, and changes the valve-closing slew rate according to the hold time.

Aspect 5

According to Aspect 5, in the drive controller according to Aspect 4, the circuitry increases the valve-closing slew rate with an increase in the hold time.

Aspect 6

According to Aspect 6, in the drive controller according to Aspect 4 or 5, the circuitry, individually controls the valve-opening slew rate and the valve-closing slew rate according to the hold time.

Aspect 7

According to Aspect 7, a head unit includes a liquid discharge head and circuitry. The liquid discharge head includes a valve to open and close the discharge port from which a liquid is discharged, and a driver to drive the valve. The circuitry generates multiple types of drive pulses to be applied to the driver of the liquid discharge head. The multiple types of drive pulses includes a first drive pulse and a second drive pulse different from the first drive pulse. The circuitry selectivity applies the multiple types of drive pulses to the driver to cause the driver to move the valve to open and close the discharge port. The first drive pulse causes the valve to move away from the discharge port at a first valve-opening speed to open the discharge port, keep opening the discharge port for a first open time, and move toward the discharge port at a first valve-closing speed to close the discharge port. The second drive pulse causes the valve to move away from the discharge port at a second valve-opening speed to open the discharge port, keep opening the discharge port for a second open time longer than the first open time, and move toward the discharge port at a second valve-closing speed faster than the first valve-closing speed to close the discharge port.

Aspect 8

According to Aspect 8, in the head unit according to Aspect 7, the second valve-opening speed is faster than the first valve-opening speed.

Aspect 9

According to Aspect 9, a head unit includes a liquid discharge head and the drive controller according to Aspect 4. The liquid discharge head includes a valve to open and close the discharge port from which a liquid is discharged, and a driver to drive the valve. The circuitry generates the multiple types of drive pulses including a first drive pulse and a second drive pulse different from the first drive pulse. The circuitry selectivity applies the multiple types of drive pulses to the driver to cause the driver to move the valve to open and close the discharge port. The first drive pulse has a first valve-opening slew rate at which the valve opens the discharge port, a first hold time in which the valve is kept in an open state, and a first valve-closing slew rate at which the valve closes the discharge port. The second drive pulse has a second valve-opening slew rate at which the valve opens the discharge port, a second hold time longer than the first hold time in which the valve is kept in the open state, and a second valve-closing slew rate larger than the first valve-closing slew rate at which the valve closes the discharge port.

Aspect 10

According to Aspect 10, in the head unit according to Aspect 9, the second valve-opening slew rate is larger than the first valve-opening slew rate.

Aspect 11

According to Aspect 11, a liquid discharge apparatus includes the drive controller according to any one of Aspects 1 to 6, a liquid discharge head including a valve to open and close the discharge port from which a liquid is discharged, and a liquid supply device to pressurize the liquid and supply the liquid to the liquid discharge head.

Aspect 12

According to Aspect 12, a liquid discharge apparatus includes the head unit according to any one of Aspects 7 to 10 and a liquid supply device to pressurize the liquid and supply the liquid to the liquid discharge head.

According to the present disclosure, the variation in the discharge speed of liquid can be reduced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The invention claimed is:

1. A drive controller comprising:

circuitry configured to:

generate multiple types of drive pulses to be applied to a driver of a liquid discharge head including a valve configured to open and close a discharge port; and apply the multiple types of drive pulses to the driver to cause the driver to move the valve to open and close the discharge port, wherein each of the multiple types of drive pulses causes the valve to:

move away from the discharge port at a valve-opening speed to open the discharge port;

keep opening the discharge port for an open time; and move toward the discharge port at a valve-closing speed to close the discharge port, wherein the circuitry is further configured to:

generate the multiple types of drive pulses, the open time and the valve-closing speed of which are different;

change the valve-closing speed according to the open time, and individually control the valve-opening speed and the valve-closing speed according to the open time.

2. The drive controller according to claim 1, wherein the circuitry is further configured to increase the valve-closing speed with an increase in the open time.

3. A liquid discharge apparatus comprising:

the drive controller according to claim 1;

a liquid discharge head including a valve configured to open and close a discharge port from which a liquid is discharged; and a liquid supply device configured to:

pressurize the liquid; and supply the liquid to the liquid discharge head.

4. A drive controller comprising:

circuitry configured to:

generate multiple types of drive pulses to be applied to a driver of a liquid discharge head including a valve configured to open and close a discharge port; and apply the multiple types of drive pulses to the driver to cause the driver to move the valve to open and close the discharge port, wherein each of the multiple types of drive pulses has:

a valve-opening slew rate at which the valve opens the discharge port;

a hold time in which the valve is kept in an open state; and a valve-closing slew rate at which the valve closes the discharge port, and wherein the circuitry is further configured to:

generate the multiple types of drive pulses, the hold time and the valve-closing slew rate of which are different; and change the valve-closing slew rate according to the hold time, and individually control the valve-opening slew rate and the valve-closing slew rate according to the hold time.

5. The drive controller according to claim 4, wherein the circuitry is further configured to increase the valve-closing slew rate with an increase in the hold time.

6. A head unit comprising:

a liquid discharge head including:

a valve configured to open and close a discharge port from which a liquid is discharged; and a driver configured to drive the valve; and the drive controller according to claim 4, wherein the circuitry is further configured to:

generate the multiple types of drive pulses including a first drive pulse and a second drive pulse different from the first drive pulse; and selectively apply the multiple types of drive pulses to the driver to cause the driver to move the valve to open and close the discharge port, wherein the first drive pulse has:

a first valve-opening slew rate at which the valve opens the discharge port;

a first hold time in which the valve is kept in the open state; and a first valve-closing slew rate at which the valve closes the discharge port, wherein the second drive pulse has:

a second valve-opening slew rate at which the valve opens the discharge port;

a second hold time longer than the first hold time in which the valve is kept in the open state; and a second valve-closing slew rate larger than the first valve-closing slew rate at which the valve closes the discharge port, wherein the first valve-opening slew rate and the first valve-closing slew rate are individually controlled based on a length of the first hold time, and wherein the second valve-opening slew rate and the second valve-closing slew rate are individually controlled based on a length of the second hold time.

7. The head unit according to claim 6, the second valve-opening slew rate is larger than the first valve-opening slew rate.

8. The head unit according to claim 7, wherein:

the first drive pulse causes the liquid discharge head to discharge a first droplet of a liquid, and the second drive pulse causes the liquid discharge head to discharge a second droplet of the liquid larger than the first droplet.

9. A head unit comprising:

a liquid discharge head including:

a valve configured to open and close a discharge port from which a liquid is discharged; and a driver configured to drive the valve; and circuitry configured to:

generate multiple types of drive pulses to be applied to the driver of the liquid discharge head, the multiple types of drive pulses including a first drive pulse and a second drive pulse different from the first drive pulse; and selectively apply the multiple types of drive pulses to the driver to cause the driver to move the valve to open and close the discharge port, wherein the first drive pulse causes the valve to;

move away from the discharge port at a first valve-opening speed to open the discharge port;

keep opening the discharge port for a first open time; and move toward the discharge port at a first valve-closing speed to close the discharge port, wherein the second drive pulse causes the valve to:

move away from the discharge port at a second valve-opening speed to open the discharge port;

keep opening the discharge port for a second open time longer than the first open time; and move toward the discharge port at a second valve-closing speed faster than the first valve-closing speed to close the discharge port, wherein the first valve-opening speed and the first valve-closing speed are individually controlled based on a length of the first open time, and wherein the second valve-opening speed and the second valve-closing speed are individually controlled based on a length of the second open time.

10. The head unit according to claim 9, wherein the second valve-opening speed is faster than the first valve-opening speed.

11. The head unit according to claim 10, wherein:

the first drive pulse causes the liquid discharge head to discharge a first droplet of a liquid, and the second drive pulse causes the liquid discharge head to discharge a second droplet of the liquid larger than the first droplet.

12. A liquid discharge apparatus comprising:

the head unit according to claim 9; and a liquid supply device configured to:

pressurize the liquid; and supply the liquid to the liquid discharge head.

* * * * *